United States Patent [19]

Huang

[11] Patent Number: 4,908,530

[45] Date of Patent: Mar. 13, 1990

[54] NON-LINEAR SQUELCH CIRCUIT FOR IEEE-802.3 PROTOCOL

[75] Inventor: Fred G. Huang, Folsom, Calif.

[73] Assignee: Hewlett-Packard Company, Palo Alto, Calif.

[21] Appl. No.: 84,961

[22] Filed: Aug. 13, 1987

[51] Int. Cl.$^4$ .................. H03K 17/16; H03K 19/3
[52] U.S. Cl. ........................ 307/443; 307/549;
307/555; 370/85.1; 370/94.1; 371/64; 375/104
[58] Field of Search .............. 307/443, 490, 549, 555,
307/556; 328/114, 115, 117, 162, 167; 375/104,
103, 99; 371/64, 57; 370/85, 94

[56] References Cited

U.S. PATENT DOCUMENTS

| | | | |
|---|---|---|---|
| 4,504,959 | 3/1985 | Heckenbach | 375/99 |
| 4,597,082 | 6/1986 | Hill et al. | 375/99 |
| 4,602,364 | 7/1986 | Herman et al. | 370/60 |

Primary Examiner—Stanley D. Miller
Assistant Examiner—Richard Roseen

[57] ABSTRACT

Method and apparatus for non-linearly filtering impulse and low frequency noise received over a network so as to avoid false activation of equipment is disclosed. A squelch circuit assures that only multiple transitions of at least three half-cycles in the received waveform of a proper frequency and amplitude will activate the receive while a single half-cycle, although of a proper frequency and exceeding the threshold, will not falsely activate the receiver. RC circuits provide a variable delay in the squelch portion of the filter to suppress impulses. In an alternative embodiment, double half-cycles will not falsely activate the receiver. Emitter-coupled logic (ECL) circuitry is preferably employed to provide speed adequate for ten-million bit per second transmissions.

15 Claims, 3 Drawing Sheets

NON-LINEAR SQUELCH CIRCUIT FOR IEEE-802.3 PROTOCOL

CROSS-REFERENCE TO RELATED, COPENDING APPLICATION

Related copending application of particular interest to this invention is application Ser. No. 084,960, filed Aug. 13, 1987, on behalf of Fred G. Huang entitled "Crosstalk Reduction in Unshielded Twisted-Pair Lines".

FIELD OF THE INVENTION

This invention relates to interconnection of electronic equipment in a local area network and, more particularly, to a filtering and squelch circuit which eliminates impulse and low frequency noise from falsely activating equipment located on the network.

BACKGROUND OF THE INVENTION

Interconnection of electronic equipment located at a premises is commonly performed by coaxial cable meeting rigorous standards. Shielded coax cable allows interconnection in a local area network (LAN) covering up to 300 linear feet distance. This is because external radio frequency (RF) energy is not induced in shielded coax cable and because crosstalk energy between parallel cables is suppressed by the use of such cable.

Installing coax cable in a premises is costly and disruptive to the work being performed. In many cases, holes must be made in walls and/or floors and, possibly, an entire subflooring must be installed, to permit routing of coax cable. Once a particular cabling arrangement is established, it can be changed only with difficulty.

Most buildings have an extensive telephone wiring system already in place. It would be highly desirable to use these twisted-pair (TP), unshielded, wires to interconnect electronic equipment, such as computers, workstations, data entry terminals, and the like. Even in buildings being planned, it would be desirable to use ordinary TP telephone wires rather than coax cable because of the formers' ease of installation and lower cost per foot.

But these unshielded TP wires act as an antenna and are susceptible to external radio frequency (RF) energy. This RF noise can swamp a signal carried by the TP wires and thus they provide very poor signal-to-noise (S/N) ratios. Particularly, when long distances such as 300 feet are involved, as would be typical of a LAN.

S/N ratios can be improved by using very high signal transmission power levels, but FCC regulations specify maximum tansmission levels and high power tansmission is costly. A better solution is to provide a totally differential balanced receiver and to filter at transmission to fall within the FCC regulations, and filter at receiver to 40–100 megahertz (MHz) which then eliminates bulk of external RF noise susceptibility.

Known in the prior art are linear bandpass filters which are used to attenuate all signals outside of the 40–100 MHz band of frequencies. Such filters are expensive and do not provide the impulse rejection needed to avoid false activation of a receiver employed a LAN. Because the LAN to be employed with the instant invention is to be interconnected by TP unshielded wires, such impulse rejection is especially important.

What is required is a fast-attack discriminating circuit which provides both bandpass filtering and "squelching" of impulses.

SUMMARY OF THE INVENTION

A low-cost filter and non-linear squelch circuit is provided by the present invention which, employed in a receiver in a LAN, eliminates low frequency noise and impulses present by virtue of unshielded TP wires interconnecting elements on the LAN. The low pass filter and non-linear squelch circuit assures that only signals have the right frequency—3 MHz to 15 MHz in the case of the IEEE 802.3 standards—and which are not transient impulses, will be passed to the receiver, causing its activation.

The resulting non-linear filter provides an inexpensive (approximately 50 cents) solution to the attenuation of error-causing transient "spikes" in the LAN and employs emitter-coupled logic (ECL) circuitry for speed. The invention assures that only a multiple transition of at least three half-cycles of a received waveform, at a proper frequency, each half-cycle exceeding a threshold level will activate the receiver. While a single half-cycle, although at a proper frequencyd and exceeding the threshold will not falsely activate the receiver. Employing certain circuit values, even a double half-cycle will not falsely activate the receiver.

The non-linear squelch portion of the circuit employs ECL comparators and logic elements providing fast suppression of transient impulses so as to avoid false activation of the receiver.

Each of a pair of ECL comparators receive the positive or negative portion of the filtered differential signal generated by the low pass filter. A threshold value is also supplied to each comparator and a signal is generated by each comparator if the filtered signal it receives exceeds the threshold. An RC circuit is connected to the output terminal of each comparator to provide a time constant for the decay of the signal generated by the comparator. This time constant is chosen to cut off all frequencies lower than 3 MHz.

An ECL NAND gate receives the signals generated by the comparators. In a preferred embodiment, a second RC circuit is connected to the output terminal of the NAND gate to avoid double half-cycle false activation.

A final ECL comparator generates a squelch signal at a level appropriate for suppressing signals generated by the low-pass filter.

DETAILED DESCRIPTION OF A PREFERRED EMBODIMENT

The instant invention is preferably employed in the receiver portion of a transceiver "Pod" and "Hub" such as is described in the related, copending application entitled "Crosstalk Reduction in Unshielded Twisted-Pair Lines". Reference should be had to that application for a complete description of a Pod and Hub employed in a local area network connected by twisted pair, unshielded wires. Such description is incorporated herein by reference.

Figure 1:
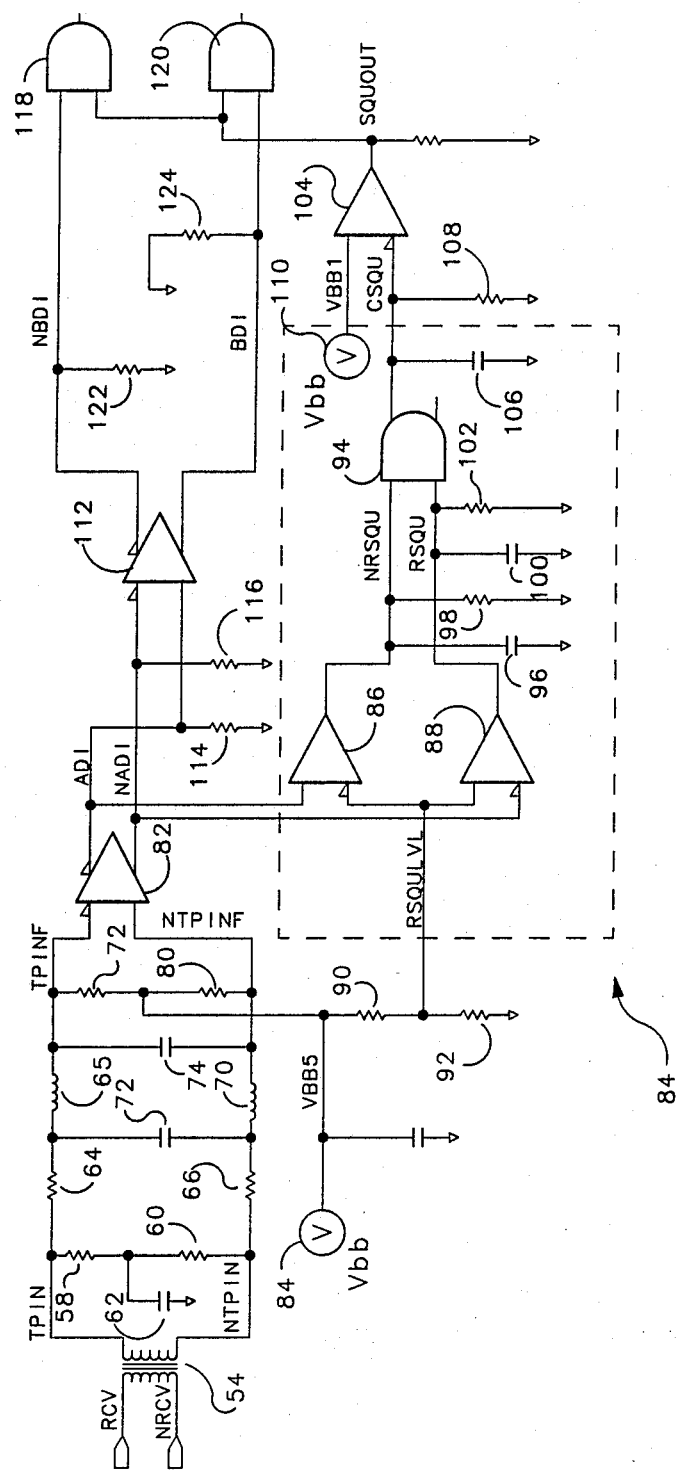
FIG. 1 is a schematic diagram of the non-linear squelch circuit of the instant invention.

FIG. 1 is a schematic diagram of a portion of the receiver section of the transceiver Pod described in the related, codpending application. Like reference numerals for elements common to the instant application and the related application are employed in the figure.

A pair of terminals 50 and 52 carries the signals received on one TP wire 20 by the Pod. Such signals may be received from another Pod in the LAN or from the LAN bankplane as explained in the related, copending application. These wires comprise one-half of the full-duplex interconnection commonly employed in telephone equipment. The signals carried thereon follow IEEE 802.3 LAN standard Protocol. A transformer 54 receives at its primary winding the signals present at terminals 50 and 52. A secondary winding of transformer 54 generates signals to the low-pass filter (LPF) 56 of the present invention.

LPF 56 includes resistors 58 and 60 connected in series between the secondary windings of transformer 54. A first terminal of a capacitor 62 is connected to the common point of the resistors 58 and 60. The second terminal of capacitor 62 is connected to ground. A pair of resistors 64 and 66 have a first terminal connected to each end of the secondary windings of transformer 54. The second terminals of resistors 64 and 66 are connected to a first terminal of inductors 68 and 70, respectively. A capacitor 72 is connected between the second terminals of resistors 64 and 66. A capacitor 74 is connected between the second terminals of inductors 68 and 70.

Also connected between the second terminals of inductors 68 and 70 is a series connection of resistors 76 and 78. The second terminals of inductors 68 and 70 is also connected to an inverting and a non-inverting input, respectively, of an amplifier (amp) 82. The common point of resistors 76 and 78 receives a reference voltage generated by a voltage source 84. The signals generated by amp 82 are differential signals passed by the low pass filter section 56 of the instant invention.

These signals are conducted to the squelch portion 84 of the non-linear squelch circuit of the present invention. Squelch portion includes ECL comparators 86 and 88 receiving at a non-inverting and an inverting terminal, respectively, the differential signals generated by amp 82. Inverting and non-inverting terminal, respectively, of comparators 86 and 88 are connected to the common point of a series connection of resistors 90 and 92. The resistors 90 and 92 serve as a voltage-divider and are connected between the reference voltage source 84 and ground.

The output terminals of comparators 86 and 88 are connected to the inputs of an ECL AND gate 94. A capacitor 96 and a resistor 98 are connected between the output terminal of comparator 86 and ground. A capacitor 100 and a resistor 102 are connected between the output terminal of comparator 88 and ground.

A complementing output terminal of AND gate 94 is connected to an inverting input of an ECL comparator 104. Accordingly, AND gate 94 functions as a NAND gate, and will be referred to thusly hereinafter. A capacitor 106 and a resistor 108 are connected between the output terminal of NAND gate 94 and ground. A voltage source 110 is connected to a non-inverting input of comparator 104. The signal generated by comparator 104 is a squelch generated by squelch portion 84 of non-linear squelch circuit of the instant invention. The voltage generated by voltage source 84 as divided by resistors 90 and 92 provides a reference voltage so that the squelch signal generated by comparator 104 has a predetermined threshold value. A resistor 111 is connected between the output terminal of comparator 104 and the common point of connection of resistors 90 and 92. Resistor 111 provides a hysteresis effect which avoids off-on-off-on cycling of the squelch circuit at the threshold.

The signals generated by amp 82 are also conducted to an inverting and a non-inverting input terminal of an amplifier 112. The input terminals of amp 112 are connected to ground via resistors 114 and 116, respectively. The signals generated by op amp 112 are differential signals conducted to a first input terminal of ECL AND gate 118 and 120, respectively. Second input terminals of gates 118 and 120 receive the squelch signal generated by comparator 104. The first input terminals of AND gates 118 and 120 are connected to ground via resistors 122 an 124, respectively.

Signals generated at the output terminals of AND gates 118 and 120 represent the differential signals actually applied to data terminal equipment connected to the LAN via the Pod including the receiver section including low-pass filter 56 and the squelch 84, comprising the non-linear squelch circuit of the instant invention.

Figure 2:
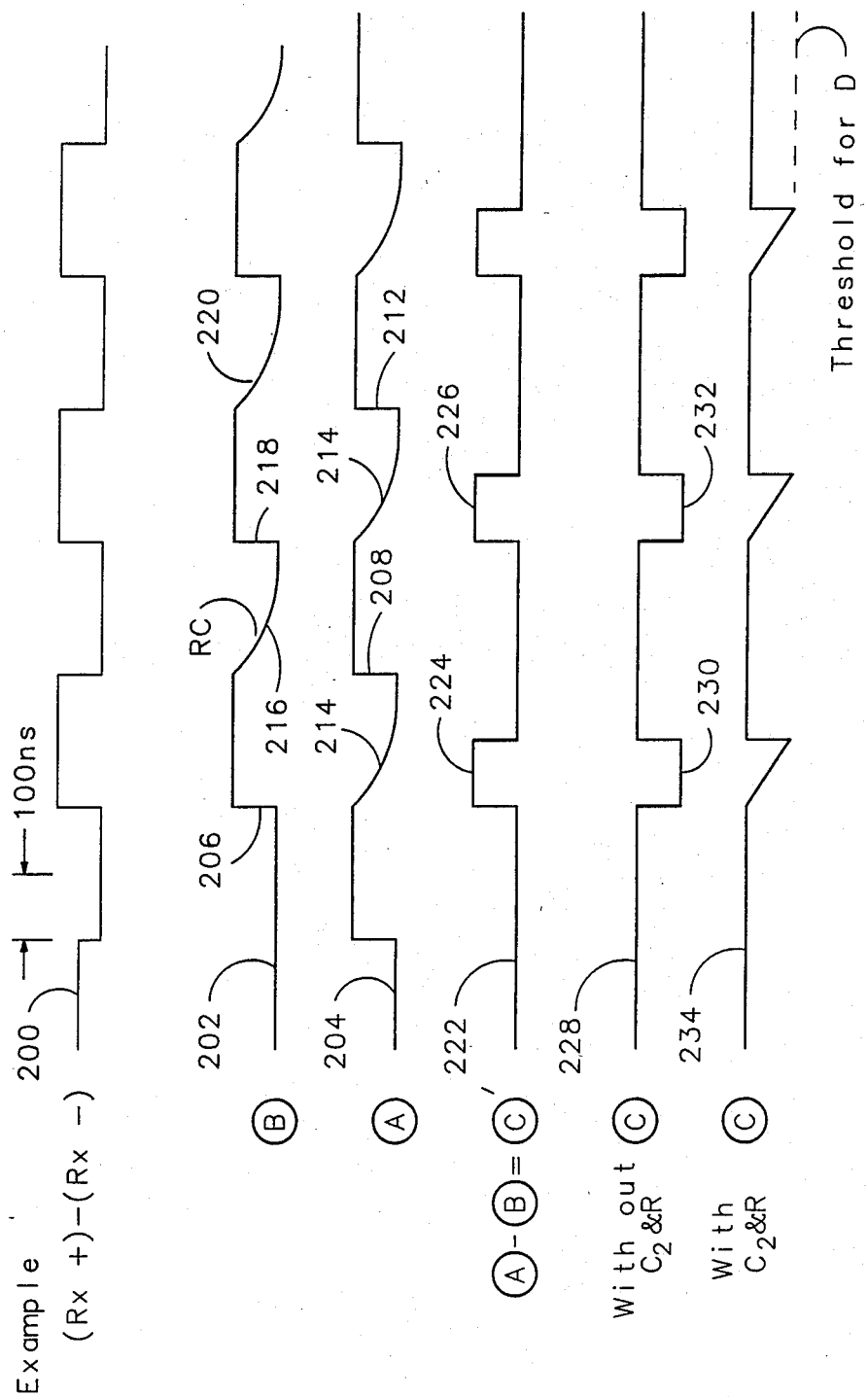
FIG. 2 is a waveform diagram illustrating the operation of the squelch circuit of the instant invention.

With reference now to FIG. 2, the operation of the non-liner squelch circuit of the instant invention will now be described. The differential signals applied at terminals 50 and 52 are passed through LPF 56 which acts a linear differential-mode rejection filter preferably having flat response at 3 MHz and a 3 dB attenuation at 15 MHz. Common-mode rejection is provided by transformer 54, and LPF56. A pod and Hub connected via twisted-pair unshielded wires in a LAN are sensitive to signals in the frequency range 3–15 MHz in accordance with the IEEE 802.3 LAN 10 base 5 standard power spectrum. LPF 56 attenuates much of the impulse and high-frequency noise associated with the use of unshielded TP wires. But, despite LPF 56, spurious transient signals representing high-frequency impulse noise or large low-frequency crosstalk noise in the LAN may falsely activate the DTE connected to the LAN because the LPF 56 will pass such noise if it is in the bandpass frequency 50 KHz–15 MHz.

Squelch circuit 84 receives differential signals Rx+ and Rx− generated by amp 82 of LPF 56, as shown as waveform 200 of FIG. 2. Because of the application of Rx+ and Rx− to inverting and non-inverting terminals of comparators 86 and 88, respectively, the difference (Rx+)−(Rx−) signal is depicted as waveform 200. The signals generated by comparators 88 and 86 are shown as waveforms 202 and 204, respectively. Each waveform experiences a sharp rise 206, 208, 210 and 212 at successive transitions of waveform 200 and a smooth drop 214, 216, 218 and 220 determined by the RC time constant determined by the values of resistor-capacitor combination 98 and 96, and 102 and 100 connected to the output terminal of comparator 86 and 88, respectively. The magnitude of the rise and overall drop shown for waveforms 202 and 204 is determined by a reference voltage generated by voltage source 84 and voltage divider comprising resistors 90 and 92.

The logical product of waveforms 202 and 204 is generated by NAND gate 94 and is shown as waveform 222. As shown, it comprises a signal reaching a HIGH level 224 and 226 upon every rising transition of waveform 200. In one embodiment of the present invention, capacitor 106 is omitted, and a corresponding waveform 228 is generated by comprator 104 representing the squelch signal applied to AND gates 118 and 120.

A single one-half cycle transition of waveform 200 will accordingly cause waveform 228 to produce a LOW logic level signal such as shown at 230 and 232 in FIG. 2. Hence, AND gates 118 and 120 will not pass the differential signal passed by LPF 56 as generated by amp 112. A single positive-going impulse even within the 3–15 MHz bandpass frequency of LPF 56 will be suppressed. Accordingly, false activation of the DTE connected to the LAN via a Pod including the non-linear squelch circuit of the instant invention, will be avoided.

Two or more such pulses occurring within 100 nanoseconds (ns), however, will not cause suppression of the received and filtered signals. This is because the RC time constants provided by resistor-capacitor combinations connected to the output terminals of comparators 86 and 88 are choosen to cause the decay of signals shown in waveforms at 202 and 204 at 214, 216, 218 and 220 too slowly to allow decline to below the level corresponding to a logic HIGH as received by NAND gate 94. Such level is set by voltage source 84 in conjunction with the values of resistors 90 and 92.

Two or more pulses occurring close in time, then, will result in NAND gate 94 generating at its complemented output, a logic LOW coincident with the second pulse. This LOW will be applied to the inverting terminal of comparator 104 which will, in turn, generate a logic HIGH signal. This signal, when applied to AND gates 118 and 120 will not suppress the differential signals passed by LPF 56 and these differential signals will be applied to the DTE and will correctly activate it.

Figure 3:
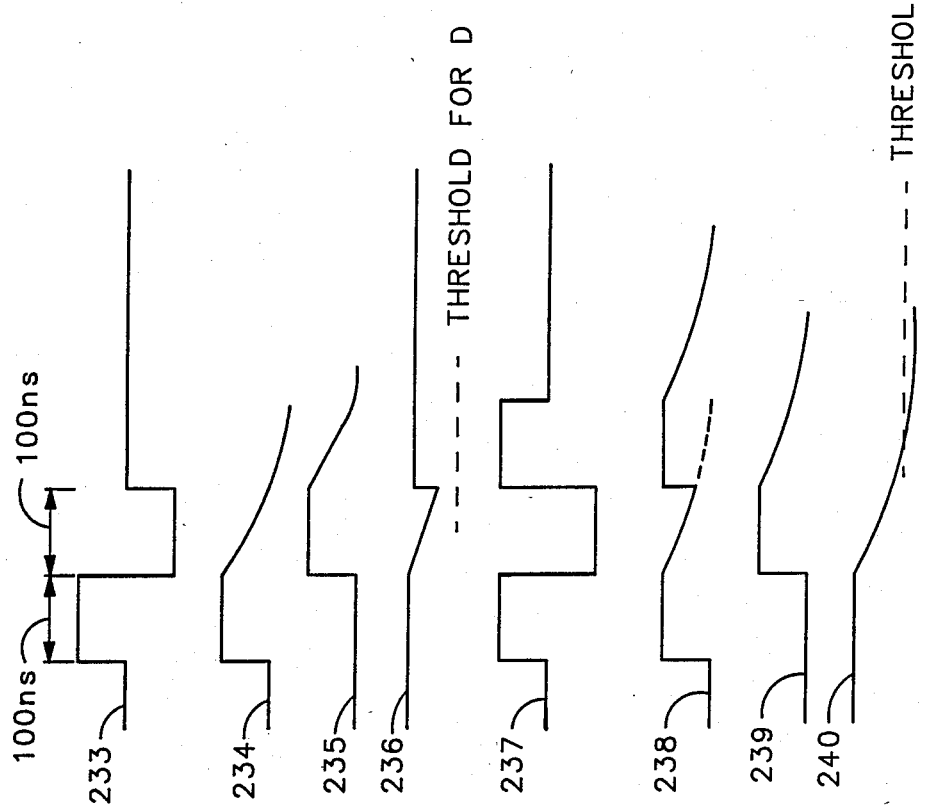
FIG. 3 is a waveform diagram illustrating the operation of an alternative embodiment of the instant invention in which a capacitor 106 is employed.

In the embodiment without capacitor 106, multiple low-frequency half-cycles of noise less than 3 MHz will produce undesirable false deactivation and activation of the squelch circuit. With reference now to FIG. 3, in an alternative embodiment of the invention, consecutive double half-cycles, as shown in waveform 233 representing one complete cycle of a spurious transient impulse can be suppressed so as to avoid false activation of the DTE equipment connected to the LAN via the Pod. The resulting signals generated by comparators 88 and 86 are shown in FIG. 3 as waveforms 234 and 235, respectively. In this embodiment, capacitor 106 is included in the squelch circuit 84. The value for capacitor 106 is selected so that even though two consecutive impulses cause NAND gate 94 to generate the LOW logic signal as described hereinabove, the signal so-generated decays as shown in waveform 236 of FIG. 3. Accordingly, by selecting the value of capacitor 106 large enough, a decay slow enough to maintain a HIGH logic signal, i.e., by maintaining waveform 236 above a threshold discriminant level "D", applied to the inverting input terminal of comparator 104, long enough through two consecutive impulses or low-frequency noise of the signal passed by LPF 56. Throughout this time, then, gates 118 and 120 will effectively be OFF and no false activation of DTE will be made.

The value of capacitor 106 will however be chosen so that three or more consecutive half-wave pulses (waveform 237) will nevertheless occur over a sufficiently long time to assure ample decay of the signal generated by NAND gate 94 waveform 240 below threshold "D" to permit generation by comparator 104 of a HIGH logic level, since the input signals to NAND gate 94 (waveforms 238 and 239) are maintained at levels sufficient to maintain a LOW logic signal. This, in turn, places AND gates 118 and 120 in an "ON" mode thereby permitting passage of received signals to the DTE.

The elements 86, 88, 94 and 104 of squelch circuit 84 are preferably ECL monolithic circuits which afford speed to permit fast suppression of impulse noise. Yet, because of the simplicity of the squelch circuit of the present invention, it provides a non-linear filter function at low cost. In another embodiment of the invention, open collector transistor-transistor logic (TTL) circuitry could be employed to provide the requisite speed.

What is claimed is:

1. A non-linear filter receiving a differential signal comprising:

means for generating a first reference-voltage;

filter means responsive to said received differential signal for generating differential signals representing said received signals having a frequency between a first and a second predetermined frequency;

squelch means responsive to said filtered signals for generating a signal at a first level upon reception of no more than a predetermined number of consecutive half-cycles of said filtered signal and at a second level upon reception of more than said predetermined number of consecutive half-cycles of said filtered signal, said squelch means comprising:

first comparator means responsive to a first of said filtered differential signals and said first reference voltage for generating at an output a binary-valued signal indicative of whether said first filtered differential signal exceeds said first reference voltage;

second comparator means responsive to a second of said filtered differential signals and said first reference voltage for generating at an output a binary-valued signal indicative of whether said first reference voltage exceeds said second filtered differential signal;

first and second passive means coupled to said first and second comparator means output, respectively, for delaying by a first selected amount the time said signal generated at said first and second comparator means, respectively, changes from a first said binary value to a second said binary value; and peak-detection means receiving said signals generated at said first and second comparator means outputs for generating at an output said two-level squelch signal when both said received signals exceed in absolute value a second predetermined reference voltage within said first selected delay time, indicating said reception of no more than said predetermined number of consecutive half-cycles of said filtered signal, and logic means responsive to said filtered signals and said squelch signal for suppressing said filtered signals upon reception of said first level of said squelch signal and for not suppressing said filtered signals upon reception of said second level of said squelch signal.

2. A non-linear filter according to claim 1 wherein said peak-detection means comprises:

a NAND gate having a first and a second input terminal connected to said first and second comparator means output, respectively, generating a signal therefrom at an output terminal;

means for generating said second predetermined reference voltage; and third comparator means responsive to said second predetermined reference voltage and to said signal generated by said NAND gate for generating at an output said two-level squelch signal indicative of whether said signal generated by said NAND gate exceeds said second reference voltage, indicating said reception of only one of said consecutive half-cycles of said filtered signal thereby generating said squelch signal at said first level and of at least two of said consecutive half-cycles of said filtered signal, thereby generating said squelch signal at said second level.

3. A non-linear filter according to claim 2 wherein said peak detection means further comprises:

third passive means coupled to said NAND gate output terminal for delaying by a second selected amount the time said signal generated at said NAND gate output terminal changes from a first to a second level, whereby said first level squelch signal generated by said third comparator means indicates reception of only two of said consecutive half-cycles of said filtered signal and said second level squelch signal generated by said third comparator indicates reception of at least three said consecutive half-cycles of said filtered signal.

4. A non-linear filter according to claim 1 wherein said logic means comprise:

a first AND gate receiving at a first input a first of said filtered differential signals and at a second input said squelch signal and generating a first differential filtered, squelched signal at an output terminal; and a second AND gate receiving at a first input a second of said filtered differential signals and at a second input said squelch signal and generating a second differential filtered, squelched signal at an output terminal.

5. A non-linear filter according to claim 1 wherein said first passive delay means comprises a first capacitor having a first capcitance connected between said first comparator means output and ground and a first resistor having a first resistance connected between said first comparator means output and ground;

wherein said second passive delay means comprises a second capacitor having said first capacitance connected between said second comparator means output and ground and a second resistor having said first resistance connected between said second comparator means output and ground; and wherein said first selected delay is the RC "time-constant" provided by said first capacitance and said first resistance.

6. A non-linear filter according to claim 3 wherein said third passive delay means comprises a third capacitor having a second capacitance connected between said NAND gate output terminal and ground and a third resistor having a second resistance connected between said NAND gate output terminal and ground, wherein said second selected delay is the RC "time-constant" provided by said second capacitance and said second resistance.

7. A non-linear filter according to claim 1 wherein said first and second comparator means are each fabricated as monolithic integrated circuits including emitter-coupled logic (ECL) circuitry.

8. A non-linear filter according to claim 2 wherein said NAND gate includes emitter-coupled logic (ECL) circuitry.

9. A non-linear filter according to claim 2 wherein said third comparator means is fabricated as a monolithic integrated circuit including emitter-coupled logic (ECL) circuitry.

10. A non-linear filter according to claim 4 wherein said first and second AND gate includes emitter-coupled logic (ECL) circuitry.

11. A non-linear filter according to claim 2 wherein said first and said second comparator means each have at least a first input terminal coupled to said first reference voltage, said first input terminals connected together, said non-linear filter further including resistance means connected between said third comparator means output and said common connection of said first input terminals of said first and second comparator means, for effecting hysteresis within said squelch means.

12. A method of non-linearly filtering a received differential signal comprising the steps:

(a) filtering said received differential signals by attenuation outside a predetermined frequency pass-band;

(b) generating a first level of a bi-level squelch signal when said filtered signals within said pass-band are not sustained for at least a predetermined number of consecutive half-cycles the steps of:

(b1) comparing said filtered signals against a first and a second predetermined reference voltage;

(b2) generating a first level of a first bi-level signal when said filtered signals exceed said first reference voltage and generating a first level of a second bi-level signal when said filtered signals are less than said second reference voltage;

(b3) delaying said first and second bi-level signals a selected amount in time said first and second bi-level signals change from said first level to a second level;

(b4) generating said first level of said bi-level squelch signal when said first and second bi-level signals exceed a third predetermined reference voltage within said selected delay time; and (c) suppressing said filtered signals within said pass-band when said first-level squelch signal is generated.

13. A non-linear filtering method according to claim 12 wherein step (b4) further calls for delaying generation of said squelch signal a selected amount in the time said squelch signal changes from said first level to a second level.

14. A non-linear filtering method according to claim 13 wherein said delay at step (b3) is selected so that said filtered signals are suppressed when not sustained for at least one half-cycle.

15. A non-linear filter method according to claim 13 wherein said delays at step (b3) and (b4) are selected so that said filtered signals are suppressed when not sustained for at least two half cycles.

* * * * *

UNITED STATES PATENT AND TRADEMARK OFFICE
CERTIFICATE OF CORRECTION

PATENT NO. : 4,908,530

DATED : March 13, 1990

INVENTOR(S) : Fred G. Huang

It is certified that error appears in the above-identified patent and that said Letters Patent is hereby corrected as shown below:

Column 2, Line 24, "frequencyd" should read --- frequency ---;

Column 5-6, Lines 62-65, the paragraph indentation should have been deleted;

Column 7, Line 46, "capcitance" should read --- capacitance ---;

Column 1, Line 54, "tansmission" should read --- transmission ---;

Column 1, Lines 54-55, "tansmission" should read --- transmission ---;

Column 5, Line 3, "comprator" should read --- comparator ---;

Column 5, LIne 21, "choosen" should read --- chosen ---.

Signed and Sealed this

Sixth Day of August, 1991

Attest:

HARRY F. MANBECK, JR.

Attesting Officer

Commissioner of Patents and Trademarks